United States Patent [19]
Lamberts

[11] B 3,992,206
[45] Nov. 16, 1976

[54] METHOD OF MAKING LENTICULAR SURFACES

[75] Inventor: Robert L. Lamberts, Rochester, N.Y.

[73] Assignee: Eastman Kodak Company, Rochester, N.Y.

[22] Filed: Nov. 15, 1974

[21] Appl. No.: 524,026

[44] Published under the second Trial Voluntary Protest Program on February 10, 1976 as document No. B 524,026.

Related U.S. Application Data

[63] Continuation of Ser. No. 290,938, Sept. 21, 1972, abandoned, which is a continuation-in-part of Ser. No. 186,130, Oct. 4, 1971, abandoned.

[52] U.S. Cl............................... 96/35; 96/81; 96/27 E; 96/41
[51] Int. Cl.² .................. G03C 5/00; G03C 5/04
[58] Field of Search ............... 96/116, 117, 118, 81, 96/27 E, 41, 35; 350/162 R, 162 SF, 128; 354/101, 103

[56] References Cited
UNITED STATES PATENTS

| | | | |
|---|---|---|---|
| 2,794,739 | 6/1957 | Gretener | 96/81 |
| 3,425,770 | 2/1969 | Mueller et al. | 350/162 R |
| 3,582,329 | 6/1971 | Ivanov et al. | 96/35 |
| 3,592,529 | 7/1971 | Juhlin et al. | 350/162 R |
| 3,775,110 | 11/1973 | Bestenreiner et al. | 96/81 |

OTHER PUBLICATIONS
R. L. Lamberts, "Characterization of a Bleached Photographic Material", Jan. '72, Applied Optics, v. 11, No. 1.

*Primary Examiner*—Edward C. Kimlin
*Attorney, Agent, or Firm*—John D. Husser

[57] ABSTRACT

Lenticules of predetermined optical power and size are formed photographically in the emulsion of a photographic film. An emulsion is exposed to a target having a profile mathematically related to the cross sections desired in the lenticules to be formed. Exposure can be to a cyclically uniform target through a cylindrical lens, by scanning the cyclical target across the emulsion, or by scanning a single profile across the film emulsion in a raster pattern. Upon processing the emulsion in a prescribed manner, a phase image comprising contiguous cylindrical lenticules having cross sections which are predetermined in accordance with the target profile is formed in the emulsion. In a second embodiment, lenticules in an array or matrix having predetermined profiles are produced by exposing two emulsions to a target as above described and processing both emulsions to density images. The density image carrying processed emulsions are then superimposed, the density images formed thereon being orthogonally oriented. A third emulsion is then exposed to the superimposed orthogonally oriented emulsions. Upon processing the third emulsion to an image, lenticules having the desired cross sections are formed in relief in the third emulsion.

19 Claims, 19 Drawing Figures

ROBERT L. LAMBERTS
INVENTOR.

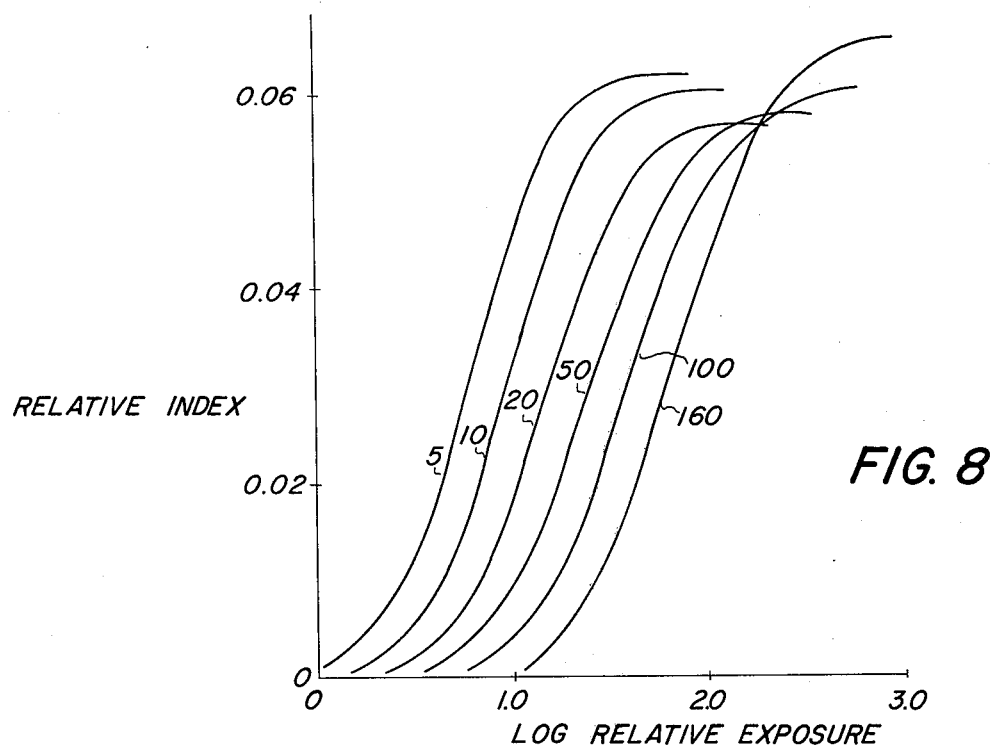
FIG. 8
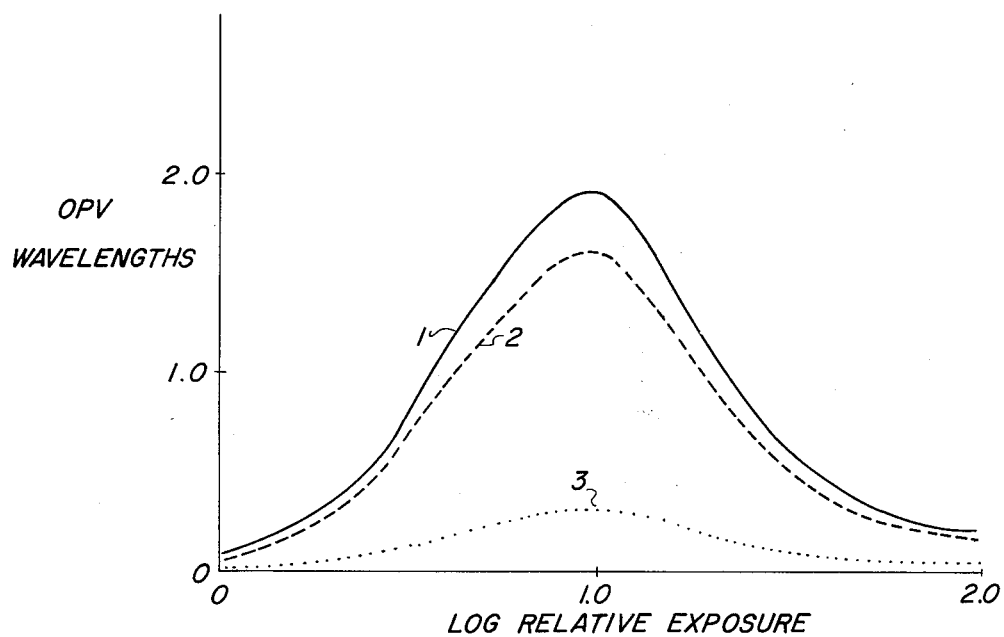
FIG. 6
ROBERT L. LAMBERTS
INVENTOR.
ATTORNEY

ROBERT L. LAMBERTS
INVENTOR.

ROBERT L. LAMBERTS
INVENTOR.

ATTORNEY

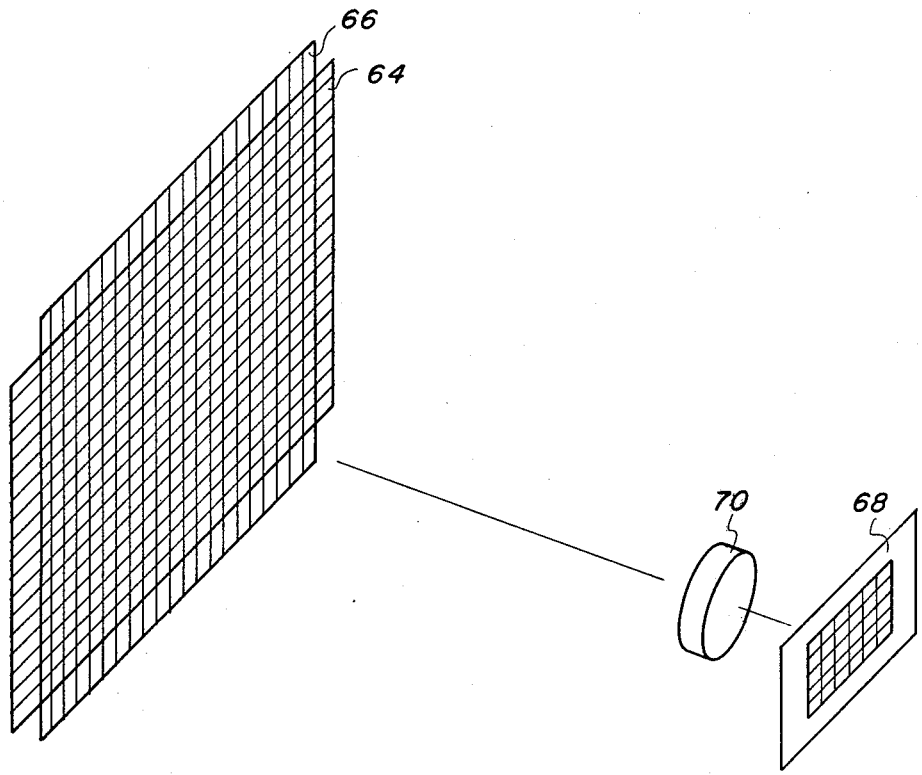
FIG. 17
ROBERT L. LAMBERTS
INVENTOR.
ATTORNEY

METHOD OF MAKING LENTICULAR SURFACES

This application is a Continuation of U.S. Patent application Ser. No. 290,938 filed on Sept. 21, 1972 (now abandoned, which was a Continuation-in-Part of U.S. Patent application Ser. No. 186,130 filed on Oct. 4, 1971 (now abandoned).

The present invention relates to a method of making lenticular surfaces and more particularly to a photographic method for producing lenticular screens and masters for forming screens comprising arrays of lenticules having predetermined profiles.

The use of lenticular or lenticulated surfaces, i.e., surfaces comprised of a plurality of contiguous minute lenses or optical microelements, has been found advantageous in many applications requiring the controlled redistribution of radiant energy. For instance, lenticular surfaces have been found useful as high brightness front and rear projection screens and in microimaging systems as well as in three-dimensional and certain color systems. Quite often it is desirable that the lenticular surfaces comprise lenticules which accurately duplicate a selected or predetermined profile or cross-section. Existing techniques for producing such surfaces, being primarily mechanical, are generally time consuming, expensive, inefficient, and otherwise inadequate.

Photographic methods for forming lenticular screens are disclosed in U.S. Pat. No. 2,182,993 to Moreno as well as in French Patent 2,010,108 to Agfa-Gevaert AG.

The Moreno patent, U.S. No. 2,182,993, discloses a method for photographically making a prismatic screen. An emulsion is exposed to a grating or grid. The emulsion is then developed by employing only developers that attack the top surface of the film first. Underdevelopment is the goal since after development, the emulsion is subjected to a hardening process. The emulsion is then hardened, bleached, and treated with hypo to form a prismatic screen comprising a relief image of flat planar surfaces interspaced by V-shaped grooves in a pattern corresponding to the negative of the grid exposed on the emulsion in the first step of the process. The formation of cylindrical lenticules having a selected curved cross section, such as parabolic or circular, is not disclosed. Since repeated exposures to reduce image size are not carried out, reduction of image size is limited to the amount the optics of the system can give in one exposure. Thus, the lenticules are obtainable only in prismatic cross section and are producible only within a limited range of sizes.

French patent 2,010,018 to Agfa-Gevaert AG. discloses a method of making lenticular screens by forming a master comprising a relief image in a photographic emulsion. The emulsion is exposed to a periodical variation of light. This is accomplished by scanning a periodically varying source of light at a constant speed or by scanning a constant intensity source at a variable speed across the emulsion. The emulsion is then processed and developed, including a bleaching or a tanning step, to establish a relief image comprising cylindrical lenticules. Another disclosed way of exposing the emulsion is by superimposition of two coherent rays. The constructive and destructive interference between the two rays establishes a distribution of intensity which is recorded onto the emulsion.

Another method of exposing an emulsion for processing to a phase image disclosed in French Patent 2,010,018 utilizes a slit located in front of a luminous source. The slit is imaged onto the emulsion and moved at a periodically variable speed so that the amount of light falling onto the emulsion is representative of the periodic function controlling the slit speed. The luminosity of the image of the slit can also be varied by periodically controlling the intensity of the light source. The slit can also be vibrated while scanned across the emulsion to control the light intensity distribution recorded on the emulsion.

French Patent 2,010,018 also discloses a two exposure process known as "additive exposure". An exposure is made of light passing through a grid. The grid is then rotated 90° and the emulsion is exposed again to the grid to produce, upon processing, a lenticular screen comprising spherical lenticules. Two grids having unequal spatial frequencies can also be used to form a lenticular screen having toric lenses.

One object of the invention is to provide a photographic method of producing relief images comprising lenticules having increased height, improved uniformity, and sharper cusps than the relief images resulting from prior art processes.

Another object of the present invention is to provide a master for forming lenticular screens comprising an array of lenticules having selected relief profiles.

Yet another object of the present invention is to provide a master for forming front or rear projection screens having lenticules of selected profiles.

One advantage of the present invention is that a front or rear projection screen can be formed in accordance therewith having a lenticular array comprising lenticules of predetermined relief profiles.

Another advantage of the present invention is that the photographic product thereof, when used as a master to form a reflective projection screen, provides a screen having considerable reduction in scintillation and color banding when compared to the reflective projection screens of the prior art.

In accordance with the invention, lenticules of predetermined optical power and size are formed photographically in the emulsion of a photographic film. The lenticules are substantially identical in accordance with a preferred embodiment of the invention. In a first embodiment, cylindrical lenticules are formed. An emulsion is exposed to a target having a profile mathematically related to a desired lenticular cross section. Exposure can be of a cyclically uniform target through a cylindrical lens or a single target profile can be scanned in a raster pattern onto an emulsion. Too, the emulsion can be scanned once across with the cyclical target. A relief image comprising parallel cylindrical lenticules, each having the desired cross section, is developed from the latent image produced by the exposure.

Substantially identical lenticules in an array or matrix comprising columns and rows in a square or rectangular formation are produced in accordance with the invention by exposing each of two emulsions by any of the above described methods. The emulsions are then each processed to density images and superimposed with the two density images, which appear to the eye as parallel stripes or regions of equal density, at right angles to one another. A third emulsion is exposed to the superimposed orthogonally oriented density images. This simultaneous exposure of two density images is termed "multiplicative exposure". Upon processing the third emulsion to a relief image, a square or rectangular array of substantially identical lenticules is formed. Alternatively, diamond shaped arrays can be formed with multiplicative exposure by superimposing the two density images at a desired angle greater than zero.

A lenticular profile is preselected in that it is related by defined mathematical relationships to the target profile to which the first two emulsions are exposed. In addition, two different target profiles can be used to produce ellipsoidal lenticules in the third emulsion. However, if one target form is used to scan both the first and second emulsions at the same magnification, the lenticules formed upon processing the third emulsion to a relief image will be symmetrical (e.g., spherical or parabolic) about their axes of rotation. Both rotationally and elliptically symmetric lenticules can be formed to be circular or parabolic in profile if the proper target forms are selected and used. The lenticules can also be circular in profile in one plane and parabolic in profile in a plane perpendicular to the one plane.

The lenticules produced by practicing the present invention are a marked improvement over those produced by prior art methods. More lenticular height and sharper cusps are achieved because of "multiplicative exposure" than the additive exposure disclosed in French Patent 2,010,018. The use of crossed density images in a single exposure to form a desired lenticule is made possible by using an "operating curve" obtained in practicing the invention. This operating curve, which provides parameters needed to enable the calculation of a proper target profile for multiplicative exposure, is unknown in the prior art. Without the operating curve, multiplicative exposure which produces a desired lenticular profile without extensive trials is unobtainable.

Still other objects and advantages of the present invention will become apparent to those skilled in the art from the following description with reference to the drawings in which like characters denote like parts and wherein:

FIG. 6 is a graph of OPV as a function of log relative exposure for the total phase image and the relief and index components of the total phase image;

FIG. 8 shows relative index versus log relative exposure for several spatial frequencies;

FIG. 17 shows elements used in practicing the invention;

Figure 14:
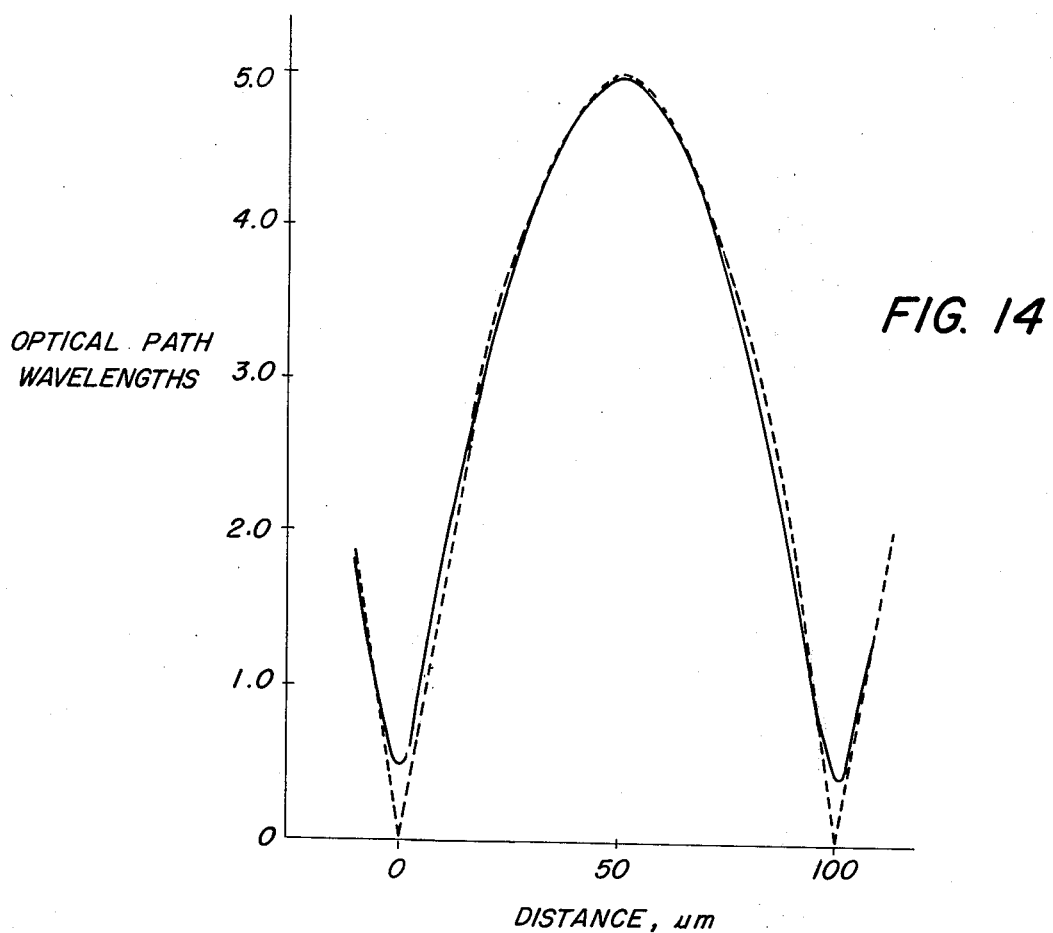
FIG. 14 shows a comparison of the OPV measured across a sample lenticule formed in accordance with the invention and an ideal parabolic form.

It is well known that the phase of transmitted light can be determined by variation in its optical path length through a given material. Two factors determine optical path length variation (OPV): (1) the variation of refractive index of the material and (2) the variation in thickness of the material. Because both factors are inherent in an image and exposed and processed into a photographic material, they will be referred to as the index image and the relief image, respectively; together they form the total phase image.

Phase transmittance is usually incidental to the manufacture of typical photographic materials. This characteristic is surprisingly stable and reproducible, especially in regard to plates that were all produced in the same production run, although it is likely to change somewhat from one set of coatings to the next. It is also well known that dry gelatin surfaces have good optical quality and that even changes in relative humidity have comparatively little effect as long as the changes are within reasonable limits.

Selected phase transmittance characteristics in processed photographic products, caused by relief images and variations in refractive index in the material, are producible if processing is properly controlled. In order to control the relief image characteristics, particularly those of bleached materials, data is acquired for the phase image corresponding to the density-log exposure curve and the modulation transfer function (MTF) curve of the density image obtained by conventional processing. Both curves are obtained from measurements of optical path variation (OPV) of sinusoidully exposed images. The density of a developed image can be calculated by linear systems theory usingg the density-log exposure curve and MTF. The effects of changes in development methods can also be included in the calculations to give a high degree of accuracy.

While many quantitative studies have been made of the phase transmittance characteristics of photographic materials, most have been measurements of diffracted light flux. H. M. Smith in J. Opt. Soc. Amer. 59, 1942 (1969) was the first to show that quantitative relief image data can be used to construct a relief image having a selected profile. Smith constructed a square-wave repetitive pattern relief image.

Relief images manifest themselves on the surface of most developed photographic images. In another study of relief images, H. M. Smith in J. Opt. Soc. Amer. 58,533 (1968) showed that the height of the relief image for a repetitive pattern depends upon the spatial frequency of the pattern. It was also shown that the image height peaks at a relatively low frequency and that the peaking frequency is dependent upon the thickness of the emulsion layer. The thicker the layer, up to a certain point, the lower the spatial frequency yielding peak height.

The index image part of unbleached silver images has been examined in considerable detail. It has been found that there can be a small refractive index variation associated with a variation in optical density. In general, the refractive index is lower in regions of higher optical density and higher in regions of lower optical density. Thus, for a given spatial frequency, the index of refraction is linearly related to the mass of silver per unit area in an emulsion.

In a bleached photographic image, essentially transparent silver halide grains with a refractive index of about 2.25 (for silver bromide) are imbedded in gelatin that has an index of about 1.535 for a wavelength of 632.8 nm. Therefore, the silver halide significantly increases the bulk index of the emulsion layer. An index of refraction on the order of about 1.64 is typical for an unexposed, unprocessed holographic emulsion.

Figure 1:
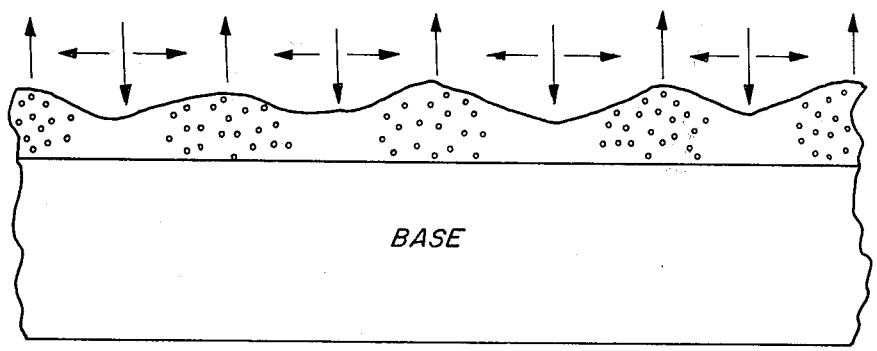
FIG. 1 shows the shrinkage of gelatin in a cross-section of a typical emulsion containing a relief image and grains of silver halide and supported on a base.

Referring now to FIG. 1, it is generally understood that a relief image is formed when an emulsion dries. The relief image is the result of differential shrinkage forces, as indicated by the arrows, which cause an emulsion 5 on a base 4 to pile up in areas 6 where shrinkage actually takes place and to stretch out in other regions 7. Part of the relief image results from a variation in bulk of the silver or silver salt imbedded in the gelatin, but for silver images, this accounts for only a small percentage of the relief height.

Lateral shrinkage forces which occur during the drying of the gelatin are observable from the curling of film while it dries after being washed, since film is coated with gelatin on one side only and does not have an anticurl coating on the side opposite the gelatin containing emulsion layer. As the film dries, the forces become rather strong, but vary, however, with the particular processing the film has just received. A simple experiment is shown in the Table. Measurements of the radius of curl can be repeated to with ± 5%.

TABLE

Film Curl as a Function of Process

| Process | Radius of curl (mm) |
|---|---|
| Wash-dry | 28.0 |
| Expose, develop 5' in $S_D$-48 developer, fix, wash, dry | 32.0 |
| Expose, develop 5' in HRP developer, fix, wash, dry | 33.5 |
| Fix, wash, dry | 39.5 |

Shrinkage is greater when more material is present in the gelatin. Greatest curl occurs when the film is simply washed since essentially all of the silver halide remains in the gelatin. The least amount of curl occurs when all the silver and silver salts are fixed out. Film containing developed silver shows a curl that is between the two extremes. Developing a heavily exposed film in a tanning developer produces a measurable but comparatively small increase of curl over one developed in a conventional developer.

Because there is always an over-all shrinkage of the gelatin, the differential shrinkage causes a lateral movement and piling up of the gelatin in regions of lower compliance. If the dried gelatin is considered as essentially incompressible, the relief height should be proportional to the derivative of the lateral motion. For low spatial frequencies this motion is restricted because the emulsion is attached to the base. Hence, the relief height is less for lower spatial frequencies. For higher spatial frequencies the shearing forces within the gelatin tend to limit the surface gradients and therefore the relief height.

Figure 2:
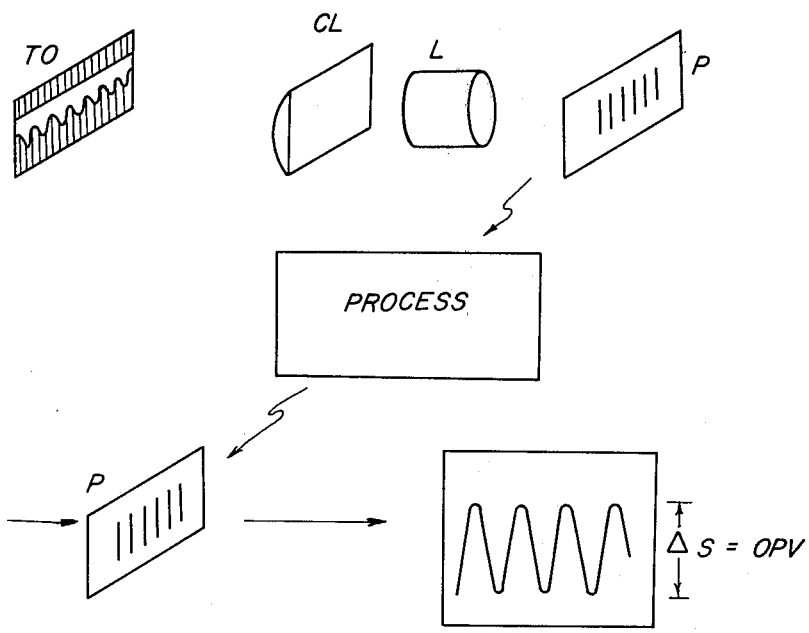
FIG. 2 shows exposing and measuring steps in accordance with the invention.

It is not generally recognized that relief images are relatively insensitive to drying methods. The exposing and measuring procedure for determining OPV is schematically represented in FIG. 2. As shown therein, light of approximately equal intensity is directed onto mask 8. The light passing through mask 8 is modulated by cyclical target profile 9 therein. The modulated light passes through cylindrical lens 10 and image forming lens 15 to form latent images comprising parallel regions of equal exposure schematically indicated by parallel lines 16 on emulsion 17. The processing of emulsion 17 is illustrated by block 18. Processed emulsion 17' carries parallel regions of equal height phase images comprising relief and index images which are represented by parallel lines 16'. When processed emulsion 17' is illuminated uniformly with light as indicated by the arrow L, the optical path differences schematically shown in block 19 can be measured. The wavy line shown in block 19 schematically shows the OPV of the processed emulsion. $\Delta S$ is the difference between the shortest and longest optical paths through processed emulsion 17', i.e. the OPV.

Figure 3:
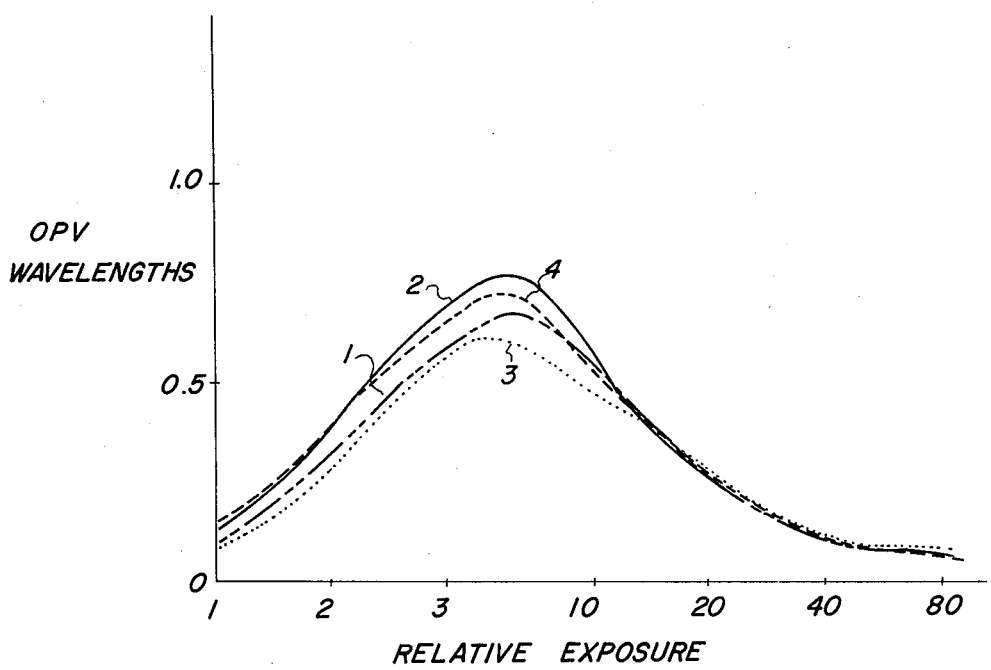
FIG. 3 is a graphical showing of Optical Path Variation (OPV) in wavelengths as a function of relative exposure for exposures on bleached plates dried at normal temperature, by forced hot air, under refrigeration, and with isopropyl alcohol.

To illustrate the FIG. 2 process by way of a particular example, four 16 mm Kodak spectroscopic 649F plates were exposed for MTF measurements. Each plate was exposed to white light with a series of patterns comprising a sinusoidal exposure waveform of 10 cycles per mm and a modulation of 25.2%. The exposure times for the patterns in the series ranged from 1 to 90 seconds. The plates were all processed together for five min. in HRP developer, fixed, bleached for 1 min. in R-10 bleach bath, fixed, and washed. The individual plates were then dried (1) at normal room temperature (air not moving), (2) with forced air, (3) in a refrigerator at about 4°C, and (4) with isopropyl alcohol. Each plate was maintained at room conditions for at least 24 hours before its OPV was measured. Each plate was then scanned to measure its OPV. The curves of OPV vs. log exposure are shown in FIG. 3 and numbered 11–14, coinciding with drying methods (1) – (4), respectively. Although some differences are apparent, they are not much larger than statistical processing variations.

On the basis of the FIG. 3 showing, although relief images, as such, are actually formed during the drying stage, the method for drying is not nearly as critical as the methods for developing and bleaching. However, for as accurate as possible reproduction of relief images, all processing stages should be carefully controlled.

As can be seen from the above discussion, the height of the relief image for a given emulsion is affected primarily by the developer, the bleach, and the silver or silver salts that remain in the gelatin after processing. Materials processed with tanning developers such as Kodak tanning developer or SD-48 show markedly higher relief images than those processed in the more commonly used developers, Kodak developer D-19 and Kodak HRP developer. Too, I have found that a dichromate bleach such as Kodak bleach bath R-10 produces a tanning action comparable to that of a tanning developer. Other bleaches such as ferricyanide or cupric chloride produce little, if any, tanning action.

The tanning action of the R-10 bleach can be varied by changing the dilution with water or by changing the pH. I found that for 649F plates exposed to sinusoidal patterns of 10 cycles per millimeter (mm), developed in HRP developer, fixed, bleached, and fixed once again to remove all silver and silver halide, the relief height could be approximately doubled by diluting the 1:1 solution with 10 parts of water. The 1:1 solution itself produced almost three times as large a relief image when the sulfuric acid was reduced from 14 milliliters (ml) to 9 ml per liter in the R-10 bleach solution.

In order to characterize a bleached photographic material, one would like to be able to predict the OPV that is associated with a particular exposure distribution. To do this, it is desirable to have a sensitometric operating curve that is analogous to the density-log exposure curve for conventional processing, and a frequency response curve analogous to the modulation transfer function. In accordance with the invention, a method for mathematically determining the operating curve and the frequency response curve is provided since direct measurement of the refractive index or of the thickness of a relief image for a step-wedge exposure would not be practical.

In Smith's measurements of the relief images associated with certain bleached images, he found that the relief height was linearly related to the density of the developed image before the bleaching step. This indicates that the sensitometric operating curve is essentially identical with the density-log exposure curve before bleaching.

There are a number of problems with such measurements, however. First, the exposure range over which one can make suitable phase images very often exceeds the exposure range producing density images measurable with known instruments. Good bleached holograms, for example, can be made from plates that are much too dense to be read on any reliable densitometer. Second, to establish linearity relationships it is necessary to measure the density images with a microdensitometer. Typically, such measurements are confined to density values below 3.0. Third, for certain types of bleach processes and particularly for nonphotographic systems, it may not be possible to measure anything corresponding to density for any step of the process. Fourth and finally, it is known that for certain photographic materials there is not a direct linear relationship between relief height and density.

In carrying out the invention, these measurement problems are solved. The method illustrated in FIG. 2 is used for obtaining the necessary data indirectly from OPV measurements of sinusoidally exposed patterns. FIG. 3 shows OPV plotted as a function of log exposure (for emulsions dried under assorted conditions as above indicated). As previously stated, the patterns measured were made as an exposure time series so that the modulation in terms of exposure was the same for each emulsion. This means that the variation of log exposure ($\Delta \log E$) is likewise constant for each exposure level. The shapes of the FIG. 3 curves suggest that the OPV is the output from the sensitometric operating curve that is to be determined. Because $\Delta \log E$ is a constant, the OPV should be proportional to the gradient of this curve. Too, the regions where the OPV curve falls off at high and low exposure levels correspond to the toe and shoulder regions of the operating curve. Consequently, it is possible to numerically integrate the OPV curve to obtain the sensitometric operating curve. Such an integration can take the form of the summation $$S(E) = \sum_{i=1}^{r} [(\Delta S)_i / \Delta \log E] \delta \log E \ldots, \quad (1)$$

where $\Delta \log E$ corresponds to the modulation of the pattern, $\delta \log E$ is the summation increment, and $(\Delta S)_i$ is the OPV for the particular exposure level. The optical path, $S(E)$, is relative because there is an unknown constant of integration which for most purposes is unimportant. The integration can be carried out for the relief image, the index image, and the total phase image. The simple patterns imaged had a modulation on the order of 25% which corresponds to a value of $\Delta \log E$ of about 0.22. This is so small that no compensation is necessary in carrying out the invention.

To produce samples to be measured for determining the snesitometer curve, a series of exposures was made at various exposure levels and for a number of spatial frequencies. This was followed by a 5-min. development in HRP, fixing, and bleaching in R-10 (diluted 1 part Solution A to 1 part Solution B, with 1 part of water) for each sample. The bleached images in all the samples therefore contained silver chloride grains. A relief image and an index image were thus provided in each sample. All the samples were dried in a still atmosphere at room temperature.

The relief image patterns of each sample were then scanned to determine the path variation for that sample in air. For comparison, each sample was immersed in a liquid of known refractive index and scanned to obtain the OPV in the liquid. The resulting data were used to determine the refractive index variation, $\Delta n$, of the index image and the height of the relief image, $\Delta d$, using the equation $$\Delta s = (n_a - n_i)\Delta d + d\Delta n,$$

where $n_i$ is the refractive index of the immersion medium, $n_a$ is the average index of the bleached image, and $d$ is the average thickness of the emulsion layer. With two measurements of path variation, $\Delta s$, for two values of $n_i$, one can solve for $\Delta d$ and $\Delta n$. However, it is usually first necessary to determine $n_a$ and $d$, both of which vary with exposure level.

Figure 4:
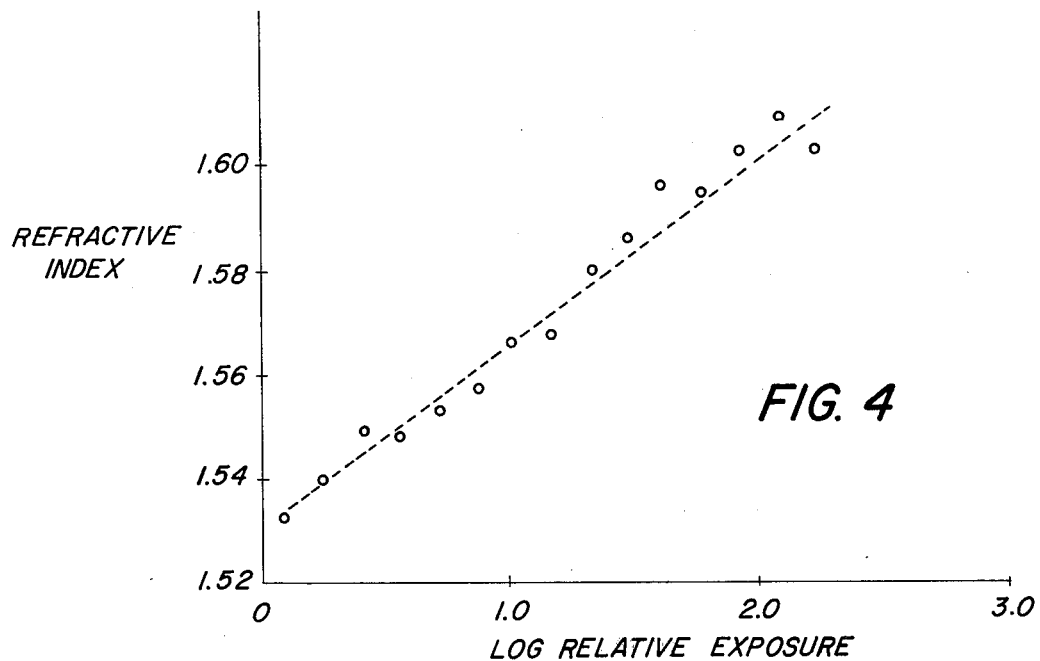
FIG. 4 is a graphical showing of refractive index as a function of log relative exposure for a selected emulsion.

To determine $n_a$, one can use a method comprising exposing and processing a step wedge on a 649F plate, making a light scratch on each step, and making scans across the scratch when the surface is immersed in liquids of various refractive indices. The path variation can then be plotted across the scratch as a function of the immersion index, assuming that the zero crossing gives the index of the emulsion layer. The data, plotted as refractive index vs. log exposure, were somewhat scattered, as shown by the points in FIG. 4, but they can be approximated by the straight line, as shown.

This approximation was assumed for purposes of computation because high accuracy was not necessary.

Figure 5:
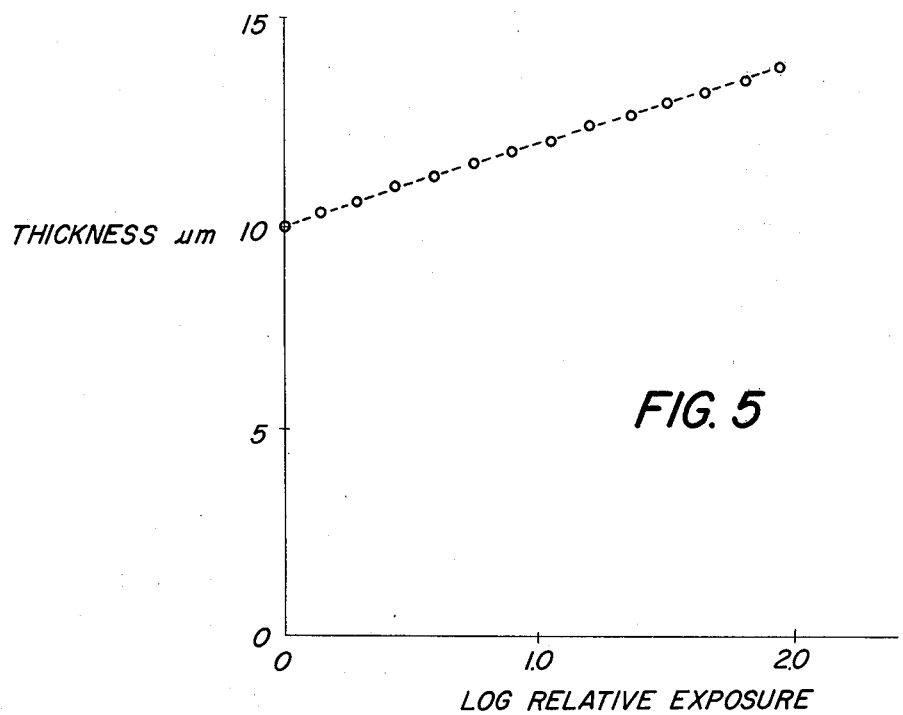
FIG. 5 is a graphical showing of emulsion thickness in micrometers ($\mu$m) as a function of log relative exposure for the selected emulsion.

The thicknesses of the emulsion layers of a plate similarly exposed to a step wedge and processed were measured with a reflection interference microscope. The measured values in micrometers ($\mu m$) were plotted as a function of log relative exposure in FIG. 5.

FIG. 6 shows OPV plotted as a function of log relative exposure for the total phase image 21, which comprises the sum of the relief image component 22 and the index image component 23. The patterns had a spatial frequency of 10 cycles per mm and a modulation of 25.2%, as imaged onto the plate. This modulation corresponds to a log exposure variation ($\Delta \log E$) of 0.223. This value, of course, was constant for all exposure levels.

Figure 7:
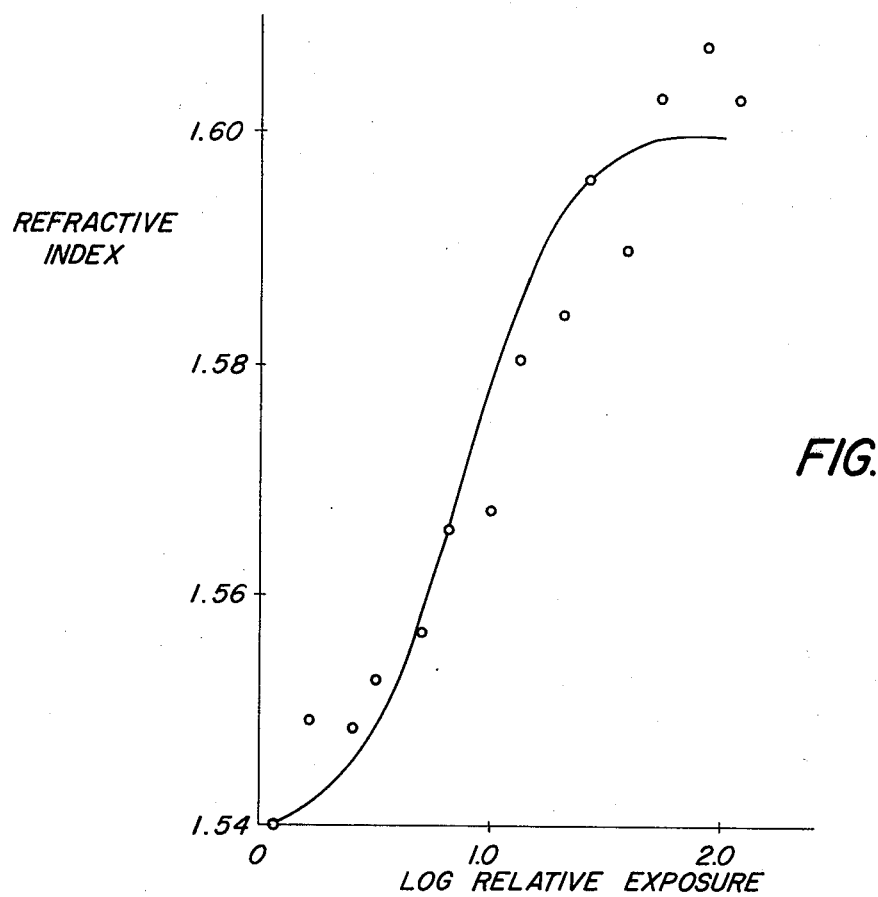
FIG. 7 shows a curve representative of the integration of the curve of FIG. 5, i.e., the index-image operating curve of refractive index as a function of log relative exposure.

FIG. 7 shows a curve 24 representing the integration of the curve 23 for the index component from FIG. 6. To obtain the refractive index, each value being summed [in Eq. (2)] was divided by the appropriate value of emulsion thickness. The points shown in FIG. 7 correspond to those plotted in FIG. 4 and show agreement within experimental error.

The refractive index curve was determined experimentally for several spatial frequencies, several of which are shown (indicated in cycles per mm) in FIG. 8. For comparison, the curves have been shifted laterally from one another. As can be seen all of the curves are quite similar which indicates they are independent of spatial frequency. Hence, there is a flat frequency response for the index image, as closely as can be determined by these techniques.

Figure 9:
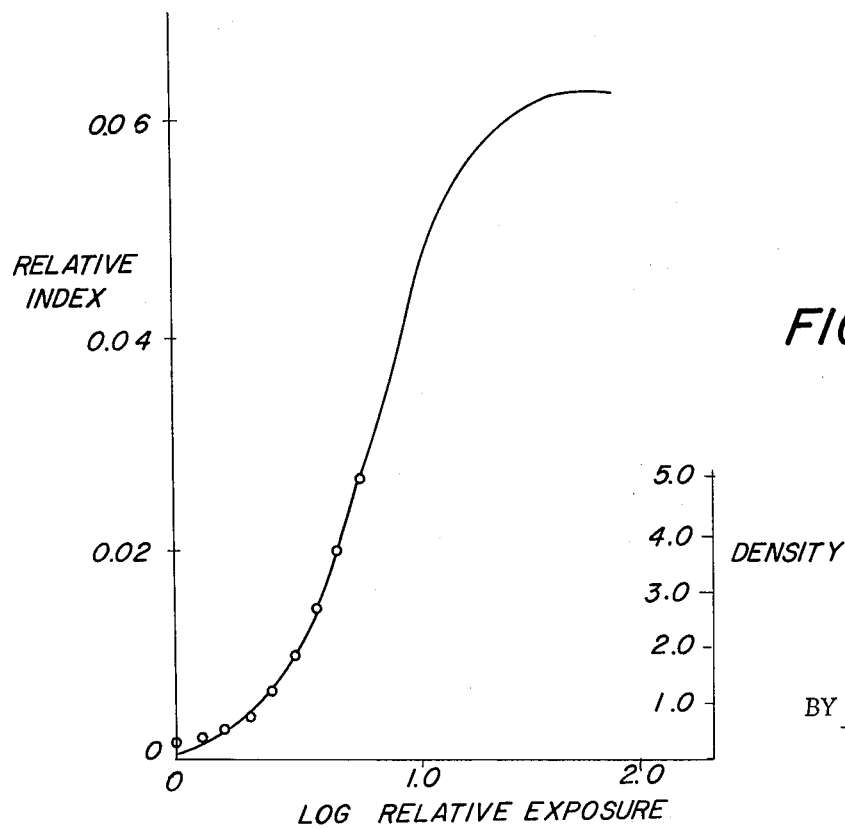
FIG. 9 shows a comparison between the index image operating curve and the D-log E curve from exposing a step wedge onto a selected emulsion.

FIG. 9 represents a comparison between the index operating curve and the D-log E curve obtained from exposing a step wedge onto a 649F plate. The plate was developed for 5 min. in HRP developer and fixed but not bleached. The measured density values are shown by the small circles and correlate remarkably closely with the index operating curve 25, up to a density of about 5.0. The index operating curve 25 implies that the D-log E curve, as represented by the small circles, would eventually shoulder off at what would correspond to extremely high density values. The eventual shouldering of the D-log E curve is inevitable, because there is always a limited amount of silver in any emulsion. The figure also shows that the exposure latitude for the bleached plate is much greater than the usable latitude for an unbleached plate. This is because density cannot be measured beyond a value of about 5 with existing instruments.

The Lorentz-Lorenz equation should be valid for a bleached photographic emulsion layer that consists of very small silver halide particles with refractive indices imbedded in gelatin that has an index of refraction of about 1.535 at a light wavelength of 632 nanometers (nm). The equation for the dielectric constant $\epsilon$ for such an emulsion can be written in the form $$\epsilon = \epsilon_1 + \frac{3 f \epsilon_1}{[(\epsilon_2+2\epsilon_1)/(\epsilon_2-\epsilon_1)]-f}, \quad (3)$$

where $\epsilon_1$ and $\epsilon_2$ are dielectric constants of the gelatin and of the silver halide, respectively, and f is the filling factor, i.e., the fraction of the total volume occupied by the silver halide grains. For red light, it is assumed that both the gelatin and the silver halide are nonabsorbing, so that the dielectric constant is simply the square of the measured bulk refractive index. To determine the filling factor, a step wedge exposure was placed on a plate which was developed, fixed, and bleached. The amount of silver per unit area of the plate was then determined as a function of the exposure. The volume of silver chloride (as obtained for R-10 bleach) per unit area could then be computed. Therefore, the filling factor was obtained because the thickness of the emulsion layer as a function of exposure was known.

Figure 10:
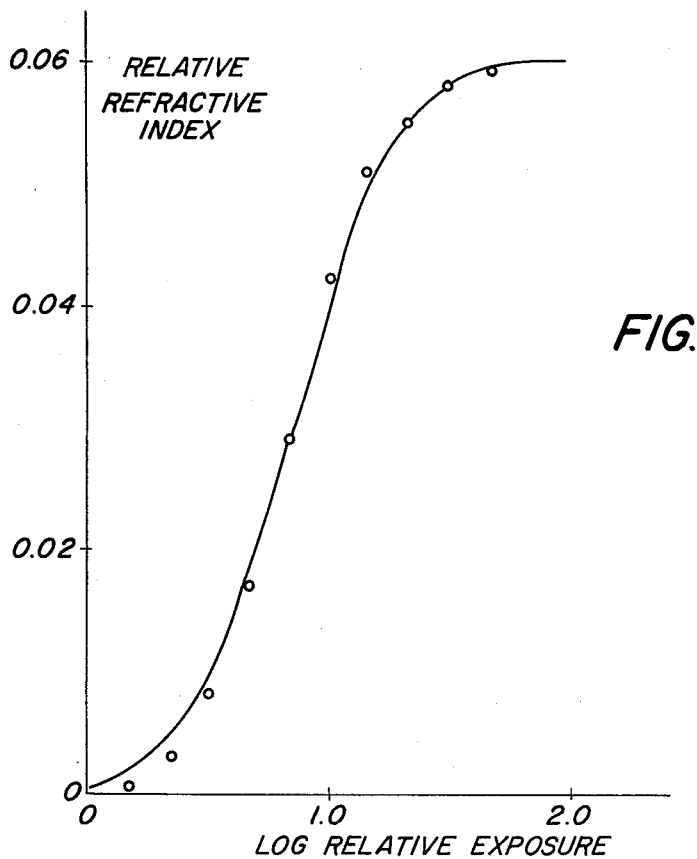
FIG. 10 shows the correlation between calculated (Lorentz-Lorenz equation) refractive index and the actual refractive index curve of FIG. 9.

FIG. 10 shows, as represented by the small circles, the correlation between the refractive index calculated by this method (assuming that $n = \sqrt{\epsilon}$) and the refractive index operating curve 26 (25 in FIG. 9).

When $f \ll 1$, there is an approximate linear relationship between the refractive index of the emulsion and the filling factor. The filling factor is directly proportional to the mass of silver per unit area of the emulsion layer surface and for this type of material the relationship between mass of silver per unit area and optical density also is reasonably linear. Thus, a substantially linear relationship between refractive index and optical density before bleaching exists, particularly for lower density values which is what has been found empirically. Even for maximum exposure values, the filling factor is on the order of 0.1 and the linear approximation is still a very good one.

As above mentioned, the OPV was integrated vs. log exposure curve to obtain the refractive index operating curve; the result was divided by the values of emulsion thickness. This was done to see what was happening to the refractive index of the bleached emulsion layer.

Figure 11:
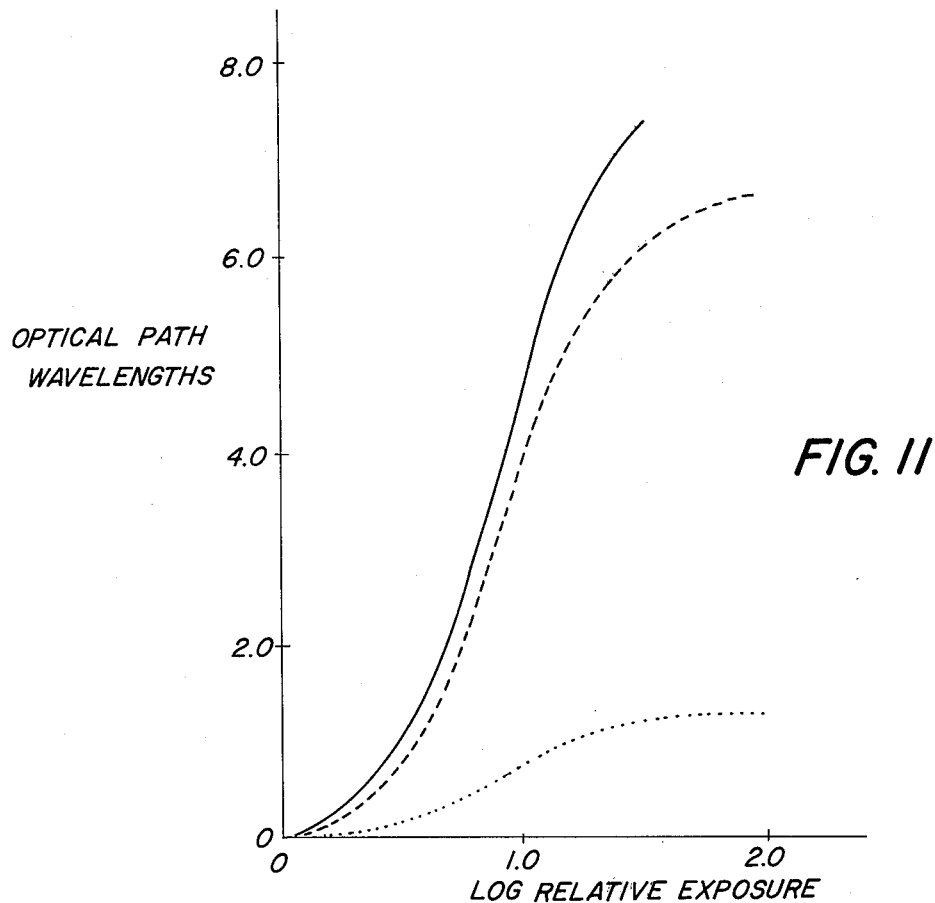
FIG. 11 shows the operating curves for total phase image, relief image, and index image.

In other situations, the operating curve obtained without division by the emulsion thickness is of interest. Such a curve would be a plot of optical path vs. log exposure. The curve obtained from data for patterns of 10 cycles per mm is shown by the curves 27, 28 and 29 in FIG. 11. The difference of shape between the relief image curve 28 and the corresponding curve for refractive index 27 occurs primarily in the shoulder region. There is still a good correspondence with the measurable part of the D-log E curve shown by the points in FIG. 9.

Figure 12:
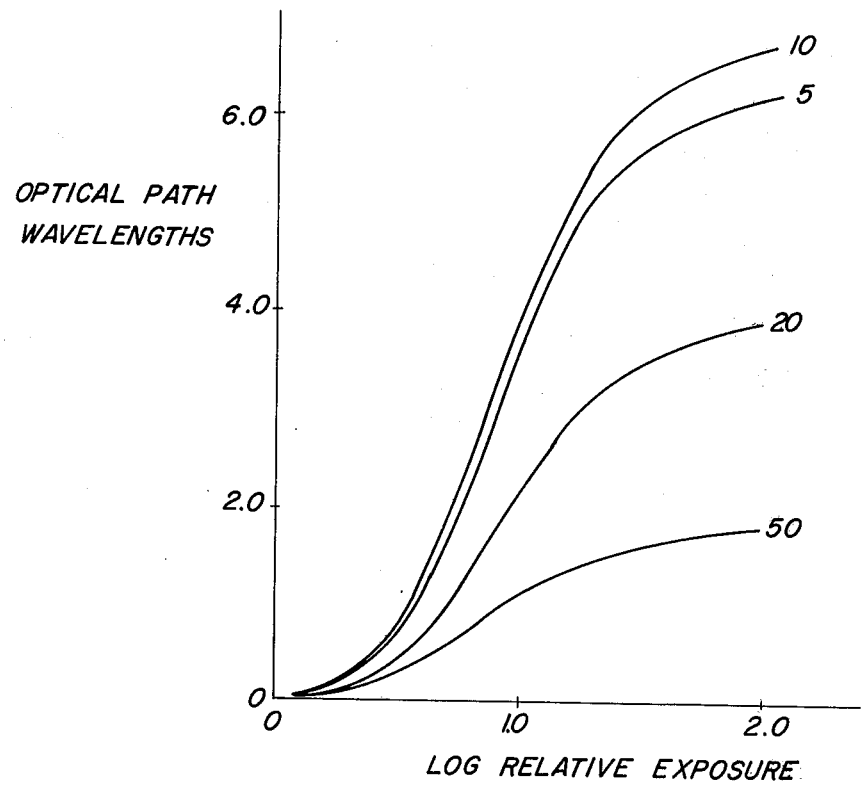
FIG. 12 shows the relief image operating curves for several spatial frequencies.

FIG. 12 shows the relief-image operating curves (optical path vs log exposure) for 5, 10, 20, and 50 cycles per mm, obtained by integrating the curves for OPV vs log exposure for the relief-image components. The curve for 10 cycles per mm has the greatest slope, as was expected, because the relief height is a maximum for approximately this spatial frequency. When these curves are normalized by multiplying the ordinate values by an appropriate constant, they all coincide reasonably well; the agreement is qualitatively similar to the agreement of the curves shown in FIG. 8. Most of the dissimilarities among the individual curves again seem to be in the shoulder regions. The lower portions of the curves are all similar and have the same shape as the operating curves for the index image, which means that the relief image and index image are both fairly linear with respect to the density of the unbleached material.

For the spatial frequencies of interest in carrying out the invention, the two contributions of OPV, i.e., the relief image and the index image are additive. It follows that the operating curve for the total phase image will also be the sum of the relief- and index-image curves. The total-phase operating curve for 10 cycles per mm is shown by the upper curve 29 in FIG. 11. As above noted, the two components are shown by the two dashed curves 27 and 28 shown below it.

Figure 13:
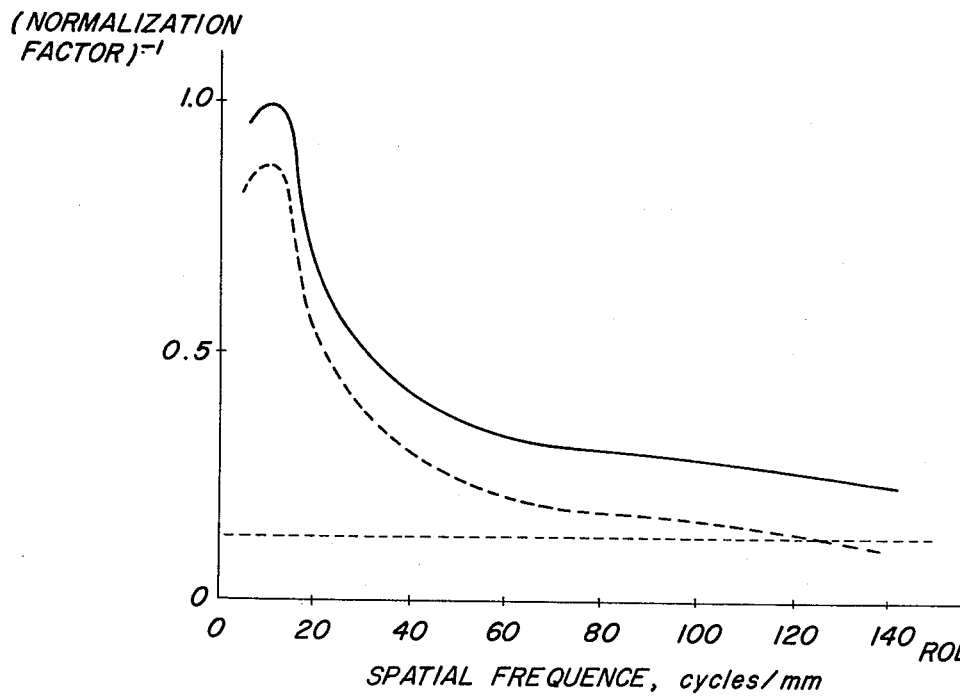
FIG. 13 is a graphical showing of the spatial frequency response curve for total phase image, relief image, and index image.

The total phase curves for various spatial frequencies can be normalized to fit one another approximately. The solid curve 31 in FIG. 13 is termed a frequency response curve and shows a plot of the reciprocal of the normalization factor as a function of spatial frequency; the two dashed line curves 32 and 33 show the relief- and index-image components, respectively.

It is well known that maximum relief image height occurs in a particular emulsion for patterns of a particular spatial frequency. For Kodak Spectroscopic Plates, Type 649F, this spatial frequency is approximately 10 cycles per mm. Because of this characteristic, in order to construct a lenticule with as low an $f$-number as possible, the lenticule should be designed so that its fundamental spatial frequency is at approximately this frequency.

For photographic emulsions with thicker emulsion layers, the maximum spatial frequency occurs at lower spatial frequencies. Thus, there are usually advantages in using thicker emulsions to construct coarser lenticules.

Data was obtained for both the linearity conditions and the spatial frequency response for a particular bleaching process used with Kodak 649F plates. In accordance with the invention, these data can be used to predict the exposure distribution required to produce a phase image of a particular selected form.

In practicing the invention, lenticular arrays which are useful as projection screens can be made photographically. First, the form of a target profile is calculated. The target profile is exposed upon a standard photographic film or plate with the target profile smeared in one direction so that a pattern of parallel lines are obtained. This is done such that the transmittance profile perpendicular to the line direction has a desired form. A second film transparency pattern, similar or substantially identical to the first is superposed on the first such that the sets of lines are mutually perpendicular. The composite film transparencies are then illuminated from behind and imaged onto a fine-grained photographic material, which is then processed in such a manner that a substantial relief image is formed which comprises lenticules of a substantially uniform selected profile.

A cylindrical lenticule with a parabolic profile can be made by using an operating curve and a frequency response curve. These two curves characterize the phase characteristics of a photographic material for a given process. The parabolic form can be that of the transmission optical path and can be determined by the combination of the relief image (thickness variations) and variations of refractive index of the bleached emulsion layer. A parabolic surface profile can also be produced by the formation of the relief image only.

Figure 15:
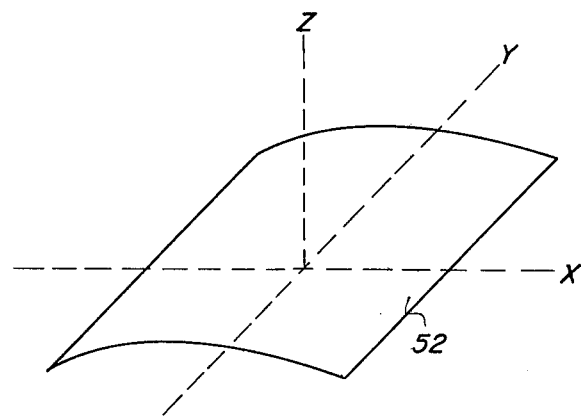
FIG. 15 shows a parabolic cylindrical surface in relation to a set of three-dimensional cartesian coordinates.

As shown in FIG. 15, the equation for a parabolic cylindrical surface 52 can be written as:

$$z = C_1 X^2 + D_1 \quad (4)$$

where $C_1$ and $D_1$ are constants. A similarly curved surface but with its axis in the x-direction is described by the equation $$z = C_2 Y^2 \times D_2 \quad (5)$$

where $C_2$ and $D_2$ are constants.

The surface for one of an array of parabolic lenticules can be described as the sum of the curvatures represented by Equations (4) and (5). It will be given by $$z = C_1 X^2 + C_2 Y^2 + D_3 \quad (6)$$

where $D_3 = D_1 + D_2$, an unimportant constant for these considerations. If $C_1 = C_2$, such a surface will be a rotationally symmetric paraboloid. If $C_1 \neq C_2$, the surface will be elliptically parabolic.

For a substantial portion of a typical sensitometric operating curve, an essentially linear relationship exists between the transmission optical path (and/or relief image height) and the logarithm of the exposure. Since the exposure is proportional to the transmittance of the film transparency test object described above, the superposition of two such transparencies provides an exposure proportional to the product of their transmittances. The logarithms of the exposures in this manner become additive and the resulting curvatures of the relief image (or transmission optical path) are likewise additive, thereby giving a shape described by Equation (6).

EXAMPLE 1

A cylindrical lenticule with a parabolic profile can be made by using an operating curve and a frequency response curve since these two curves characterize the phase characteristics of a photographic material for a given process. The effective parabolic form can be that of the transmission optical path which is determined by the combination of the relief image and variations of refractive index in the bleached emulsion layer. A parabolic surface profile can also be produced by the formation of the relief image only. The parabolic surface profile is that typically desired in forming a master for producing lenticular screens.

Figure 18:
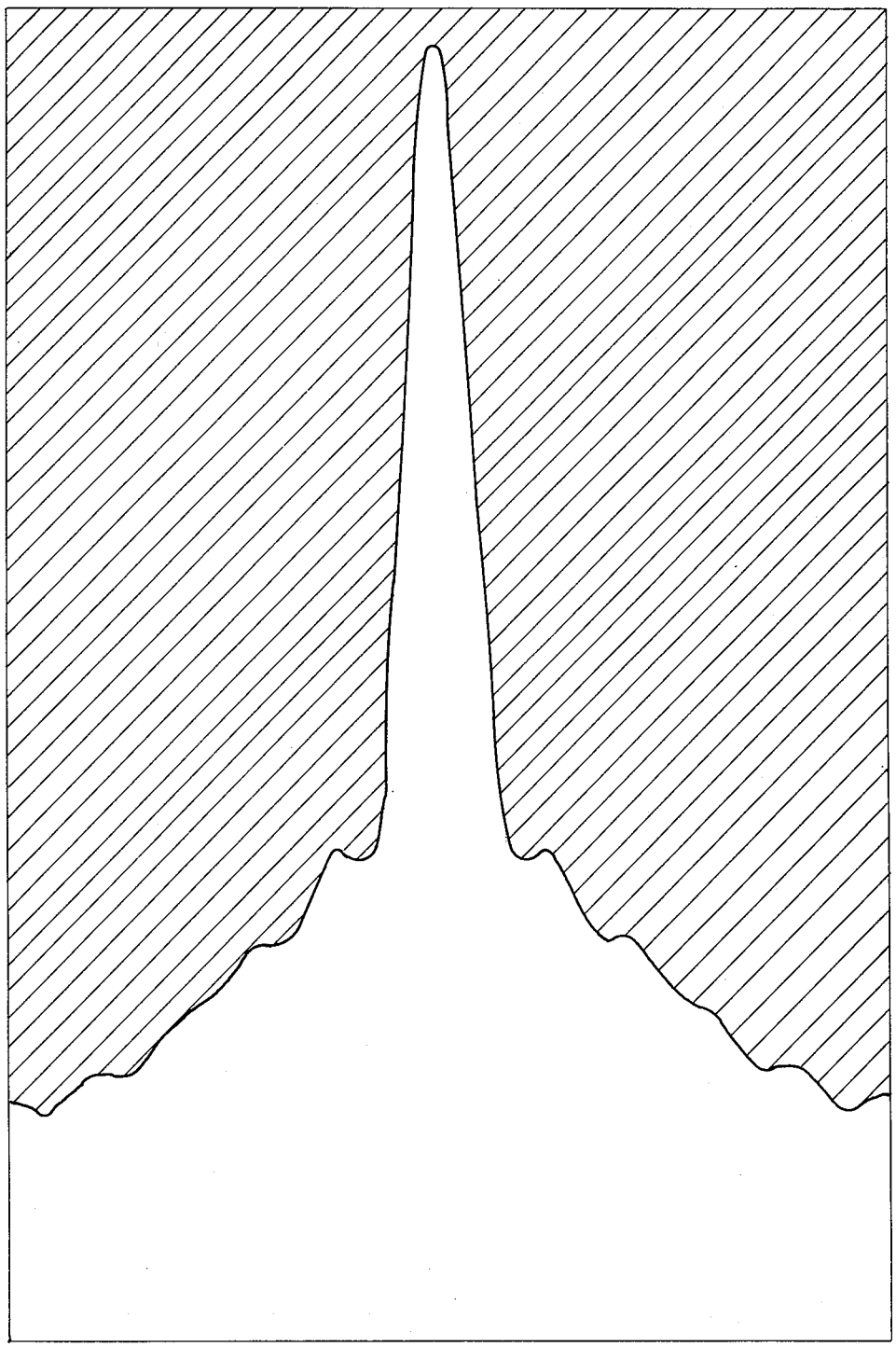
FIG. 18 shows the form of an exemplary target profile in a mask.

In accordance with the invention, in calculating the shape of a target profile, such as that shown in FIG. 18, the first step is to select the one-dimensional profile of the lenticule desired, in particular the $f$/number and spatial dimension of such a lenticule. In one embodiment, the profile formed is parabolic but variations of this form are also possible to produce as above stated.

A mathematical Fourier analysis is made of the desired form (e.g., the parabolic form) assuming that this form is one cycle of a repetitive pattern.

Next, the Fourier coefficients resulting from the Fourier analysis are divided by the corresponding values of the frequency response function characterizing the photographic material and process. The values thus obtained are used as coefficients of another Fourier series, up to some limiting harmonic such as the tenth which has been found to give good results. The combined function is now passed through the system sensitometric operating curve which expresses the exposure distribution required to fall on the photographic material to produce the desired relief image.

At this point, by using standard optical modulation transfer function techniques well known to those skilled in the art, the transmittance profile can be determined for a particular target profile to be imaged onto the photographic material. Thus, by knowing standard modulation transfer function and sensitometric techniques well known to those skilled in the art for the photographic transparency material to be used, and the lenses to be used in imaging a target profile onto that material, the form of the target profile desired can be calculated.

As an example in carrying out the invention, a master for producing lenticular screens comprising a repetitive pattern of cylindrical lenticules of a selected profile with a fundamental spatial frequency of 10 cycles per mm can be formed. The profiles of the individual lenticules are to be parabolic with a total OPV of 5 wavelengths of light 623.8 nm. The method for producing such a phase image comprises the steps of:

1. Making a Fourier analysis of the desired profile, i.e., the parabolic profile; each coefficient up to the tenth harmonic is divided by the spatial frequency response curve for the total phase image (shown as curve 31 in FIG. 13);
2. The values obtained are applied to the Fourier series, which is summed to produce a corrected waveform; this waveform is passed through the total-phase image operating curve shown as curve 29 in FIG. 11, approximately at the point of maximum slope, giving a waveform of log exposure vs. distance;
3. Making a Fourier analysis of the corresponding waveform of exposure vs. distance; the Fourier coefficients are divided by the MTF values of the lens to be used to expose the patterns to give the target profile to be used.

Figure 16:
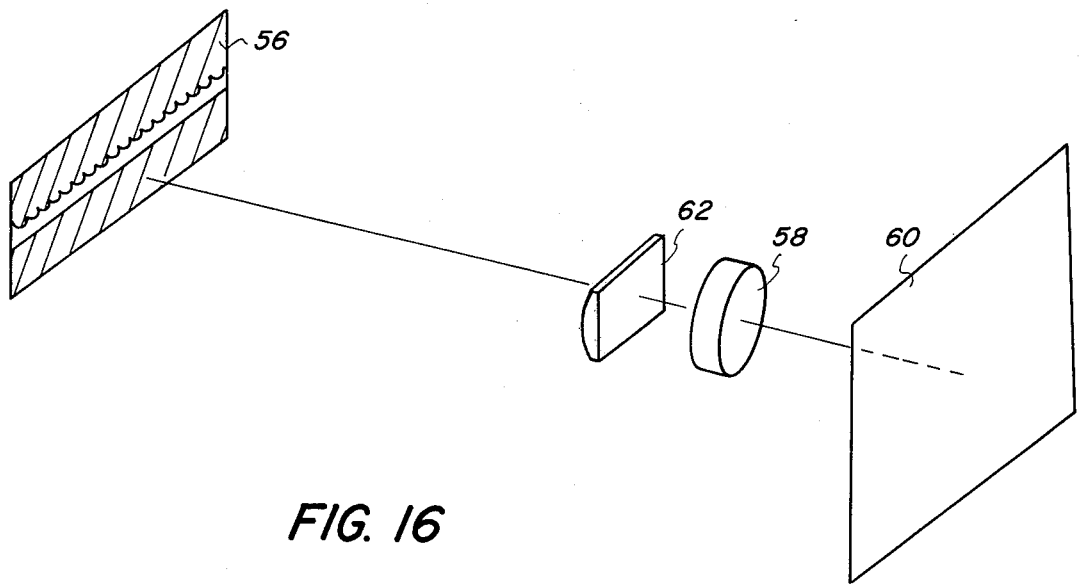
FIG. 16 shows some elements used in practicing the invention.

The exposure can be carried out as shown in FIG. 16. The target profile 55 in mask 56 as shown in FIG. 16 is in cyclical form and comprises a series of targets such as that shown in FIG. 18. Target profile 55 is exposed through cylindrical lens 62 and image forming lens 58 upon a standard photographic film 60 with the target profile smeared in one direction by cylindrical lens 62 so that a latent image comprising a pattern of parallel equal exposure levels represented by parallel lines 63 is obtained. Exposure to the cyclical form target profile of FIG. 16 will form lenticules having parabolic profiles as shown in FIG. 14 when the film is processed to a relief image. The exposed film is processed, bleached and tanned to form a surface comprising parallel cylindrical lenticules having parabolic profiles.

FIG. 14 compares the OPV measured by scanning across one lenticule formed on the bleached sample of example I with that of an ideal parabolic profile. Solid line 35 shows the actual profile of the lenticule and dashed line 36 shows the ideal parabolic form. The lenticule represented by profile 35 was designed to have a relative aperture of $f/4$. Except in the regions 37 around the base, the agreement is remarkably good. Cusp 38 is particularly sharp and the whole lenticular profile shows remarkable conformity to the selected ideal parabolic profile. It may be surprising to those skilled in the art that such results can be obtained for relief images, but the data obtained and disclosed herein have been reasonably consistent, and the control of relief images in accordance with the invention approaches that of density images obtained by conventional processing.

EXAMPLE II

The exposure is carried out as shown in FIG. 16. The target profile and optical magnification of the system are determined so that when this transparency is uniformly illuminated and imaged by a lens, a distribution of light intensity will be found that is similar to that found in FIG. 16. The latent image represented by parallel lines 63 is developed to a density image on a transparency. A second film is then similarly exposed and processed to a density image identical to that on the first transparency. The second transparency is superimposed on the first transparency such that the parallel regions of equal density represented by lines 63 in the density images are mutually perpendicular as schematically shown by grids 64 and 66 in FIG. 17. The composite film transparencies as shown in FIG. 17 are then uniformly illuminated and imaged through a focusing system schematically represented by lens 70 onto a fine-grained photographic film 68. The film is then processed to a substantial relief image comprising an array of lenticules, each having the selected parabolic profile 35 of FIG. 14.

If the same target profile is used at the same amount of magnification to expose each of the films processed to density images, the lenticules formed by the Example II method will be symmetric about an axis of rotation extending perpendicular from their bases through their apexes. Lenticules which are circular or have some other selected profile as well as the parabolic one shown can also be formed. This is because lenticular profile is a function of target profile and target profiles can be calculated and constructed to give any desirable lenticular profile. Two different target profiles can also be used. The lenticules resulting from two target profiles will be representative of one target in one profile and representative of the other target in a profile at right angles to the one profile. For example, a lenticule can be formed which is parabolic in one profile and circular in its profile orthogonal to the one profile. Too, different target magnifications can be used with the same or different targets to form lenticules having two different $f$/numbers at right angles to one another. A lenticular array with lenticules having one $f$/number in one direction and another $f$/number in the direction orthogonal to the one direction can be produced by calculating the profile desired and constructing a mask for each such profile for each of the particular $f$/numbers. The $f$/number values chosen should be such that the optical path variation for one of the cylindrical components in the calculation does not exceed half of that portion of the relief image operating curve that does not depart substantially from being linear. The two density image carrying transparencies can also be superimposed for exposure onto the third emulsion with regions of equal density at some angle greater than zero but other than orthogonal to one another to form lenticules having diamond shaped rather than square or rectangular bases using the target variations above noted. Other achievable and desirable lenticule profiles and combinations thereof will be apparent to those skilled in the art.

Also, the exposures of either or both of the first two emulsions can be carried out by scanning a single target profile as exemplified by that shown in FIG. 18 in a raster pattern rather than using the cyclical target profile of FIG. 16. Too, the FIG. 16 cyclical profile can be scanned across the film once rather than exposed through a cylindrical lens.

The logarithms of the multiplicative exposures, if taken in the FIG. 17 manner in accordance with the invention, are additive and the resulting curvatures in the relief image are likewise additive, thereby giving a shape such as that shown in FIG. 14 and described by Equation (6). If grids 64 and 66 were exposed one after the other (additive exposure) such as disclosed in French Patent 2,010,108, their transmittances would be additive and not multiplicative and the curved shape described by Equation (6) would not be attained.

EXAMPLE III

A particular process by which a square array of lenticules is obtainable with a desired relief image profile is as follows. A cyclical target profile is calculated as in Example I and a cyclical mask is constructed. As shown in FIG. 16, the mask 56 containing the cyclical target profile 55 counterpart of the target profile of FIG. 18 is photographed with a camera (not shown) equipped with a 12 inch focal length lens 58 onto Kodak Plus-X Sheet Film 60. The lens is stopped to approximately $f/40$ and a cylindrical lens 62 is placed in front of it to smear the image of the target profile in one direction as indicated schematically by lines 63. The film 60 is then developed for 5 minutes in D-19, fixed, washed, and dried. The minimum and maximum densities are comparable with those used in computing the target profile 55. Another such exposure is made to another Kodak plus-X sheet film. The exposure is followed by processing, also to a density image. The resulting substantially identical two film transparencies are then superimposed with their respective equal density image regions running at right angles as shown by grids 64 and 66 in FIG. 17. The orthogonally oriented superposed grids are then imaged at approximately ten times reduction onto a Kodak 649F Spectroscopic Plate 68 with lens 70 which is of sufficient quality to give an approximately diffraction limited image at $f/11$ over the complete field. The plate 68 is then developed to produce a large relief image comprising a square array of lenticules having the profile shown in FIG. 14. The relief image producing process is as follows:

1. Develop in Kodak Special Developer SD-48 (1 part Solution A: 1 part Solution B), for 5 minutes at 75°F.
2. Fix for 2 minutes in Kodak Rapid Fix.
3. Wash in running water for 5 minutes.
4. Bleach in modified R-10 bleach bath (whose formula is given below) for 2 minutes.
5. Wash in running water for 5 minutes.
6. Fix for 2 minutes in Kodak Rapid Fix.
7. Wash 20 minutes.
8. Dry.

Modified R-10 Bleach

| Solution A | Distilled water | 500 ml |
|---|---|---|
| | Ammonium dichromate | 20 gr |
| | Concentrated sulfuric acid | 10 ml |
| | Distilled water to make | 1 liter |
| Solution B | Sodium Chloride | 45 grams |
| | Distilled water | 1 liter |

The bleach was mixed 1 part Solution A to 1 part Solution B.

As above noted, the density images recorded on the transparencies (64 and 66) can be other than identical. The lenticule formed by dissimilar orthogonal density images can be made with greater power along one axis than the other. If the two target profiles are substantially identical in form but different in size, the two profiles will be similar but of different powers. If the two target profiles are different, the two orthogonally oriented relief profiles will be different, each having a power and profile in accordance with the target and magnification which produced it.

Example IV

A single cycle target profile of the light intensity function that describes the target profile is plotted on paper. The procedure for determining the shape of this function follows that set forth in Example I for calculating the shape of a target profile. The area within the target profile, i.e., under the curve, and above the zero level, is then cut out of the paper and painted with black paint. The mask so formed is then contact printed onto Kodak Kodalith Ortho Film Type III which is then processed as recommended and dried. FIG. 18, as above pointed out, shows the form of a target profile for a single cycle mask for producing a lenticule of approximately $f/8$ and a lenticule spacing of 0.1 mm. Calculations are made for Fourier harmonics up to the tenth. Several copies of the FIG. 18 masks are made, cut, and mounted contiguously to form a mask, such as 56 in FIG. 16, having several repetitions or cycles of the target profile. The cyclical target profile comprising the series of single cycle target profiles is illuminated with a broad, diffuse light source and is photographed with a view camera onto Kodalith Film with a size reduction to give a cycle width of approximately five centimeters. The cyclical target profile is contact printed onto Kodalith film. Enough copies are made to provide about 24 or more complete cycles of the single cycle target profile. The resulting cyclical target profiles are carefully mounted in a line, contiguous to each other, to form a repetitive pattern of the appropriate number of cycles, with a minimum variation in the spacing distance.

To further reduce target profile size, the cyclical target profile thus formed is illuminated as shown in FIG. 16 with a broad diffuse light source and is photographed onto Kodalith film at approximately ten times reduction, thereby giving a pattern about 12 centimeters long. After processing the film is contact printed on Kodalith film to form at least six copies, which are then mounted with great care in a single line such that all cycles have closely the same spacing.

The array thus formed is photographed as shown in FIG. 16 with a 5 × 7 view camera using an Eastman Ektar $f/6.3$ 12-inch focal length lens stopped to approximately $f/40$. The lens should be of sufficient quality that it is approximately diffraction limited at this aperture over the 5 × 7 image area. A cylindrical lens of good optical quality with a focal length of about 2½ inches is mounted ahead of the camera lens such that it images the illuminated test object into the aperture of this lens. The quality of lenses used for this work can be judged by visual examination of the images by using a lens bench and viewing the images at several hundred times magnification. The image formed by the camera thus consists of a series of parallel equal density regions (shown schematically as lines or stripes 63 on film 60), the irradiance profile of which follows target profile 55 in mask 56 modified by the imaging characteristics of the cylindrical lens 62. The lines 63 are approximately uniform along their length.

The images thus formed are photographed onto Kodak Plus-X sheet film which is developed for 5 minutes in D-19 developer at 75°F. The exposure is such that the maximum density of the film in the most highly exposed region of the lines is approximately 1.0 as measured with a microdensitometer. This corresponds to the conditions used to calculate the original mask as described above.

Two such transparencies are made and superimposed with emulsion layers facing each other, and with equal density regions perpendicular to each other. As shown in FIG. 17, the composite is then uniformly illuminated and photographed at 5 times reduction with a good quality lens such as a 4 Ektar enlarging lens stopped to $f/11$, onto a Kodak Spectroscopic Plate, Type 649F. The plate is processed to a phase image. During the exposure steps, proper exposure level must always be maintained since, ultimately, the shape of the lenticules depends upon the exposure level.

Figure 19:
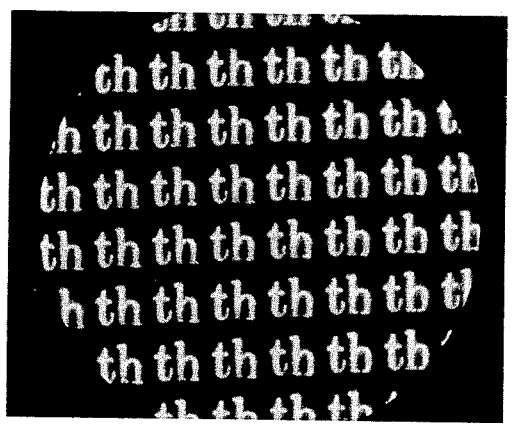
FIG. 19 shows a photograph of an array of images obtained using the product of the invention as a refracting lenticular plate.

FIG. 19 shows an array of images formed on a lenticular screen produced in the manner just described. A single pair of letters, "th" made in the form of a transparency, were placed below the lenticular plate and illuminated. The images as shown were formed above the plate and were examined with a microscope.

Example V

A cyclical target profile can also be produced by mounting a strip of Kodalith film approximately 30 inches long in a suitable platen, exposing the image of a single cycle such as that of FIG. 18 onto the film with a reduction to give a cycle width of approximately 5 mm, and stepping the platen along its length in increments of the cycle width between exposures. The image developed can be used as a mask and the methods of Examples II, III and IV carried out to produce lenticular arrays.

Example VI

Another method of exposing an emulsion in making a master for forming a lenticular screen is to mount a sheet of Kodak Plus-X sheet film on a drum of suitable diameter and rotate the drum at a constant speed while imaging one or more cycles of the target profile onto the film. The lens is moved continuously in a direction parallel to the axis of the drum at a velocity of 1 mm for each drum revolution. The exposed screen can be processed to a phase image to form a cylindrical lenticular screen. Alternatively, two exposures can be taken of the same (or different) targets and processed to density images, followed by the FIG. 17 process to form a square (or rectangular array) of lenticules.

Example VII

Another process for producing a large relief image with photographic material such as Kodak Spectroscopic Plates, Type 649F, exposed by one of the aforementioned methods, is as follows:

1. Develop for 5 minutes in Kodak Tanning Developer at 75°F (mixed 1 part Solution A to 1 part Solution B).
2. Fix for 2 minutes in Kodak Rapid Fix.
3. Wash in running water for 5 minutes.
4. Bleach in modified R-10 bleach bath (as described above).
5. Wash in running water for 20 minutes.
6. Dry.

In this process, silver halide is allowed to remain in the exposed regions of the emulsion. The presence of the silver halide tends to increase the refractive index of the bleached emulsion as compared with gelatin only. Thus, for refracting purposes, the refractive index variation must be taken into account. However, if the surface is to be replicated, such as if it is used as a master for forming lenticular screens, the relief image only need to be considered.

When a master for a lenticular screen is formed in accordance with the invention, replications can be made of the relief image surface using a variety of well known techniques. With many of these techniques, the master is accurately reproducible and there is very little difference in quality between the original surface and the duplicate.

Preferably, the relief image formed on the gelatin surface in accordance with the invention is used as a master and is duplicated to produce a substantially identical surface on a more durable material for use, for example, as a front projection screen or as a rear projection screen. The gelatin can, of course, be mounted and used as a screen itself, even being coated to provide a harder surface. Furthermore, the method in accordance with the invention is applicable to a variety of materials, nonphotographic as well as photographic.

The invention has been described in detail with particular reference to preferred embodiments thereof but it will be understood that variations and modifications can be effected within the spirit and scope of the invention.

I claim:

1. A method of producing an array of cylindrical, lenticular elements on the emulsion surface of a photographic material having operating and frequency response curves in accordance with the photographic characteristics of the emulsion, each of the elements having the same predetermined profile, comprising the steps of:
   forming a light modulating target having a cyclical, one-dimensional, profile pattern of the lenticular elements, the profile pattern being mathematically related to the cross section of the predetermined profile and the operating and frequency response curves of the emulsion;
   establishing an exposure for the photographic material in accordance with the sensitometric characteristics thereof;
   positioning the light modulating target in the object plane of an optical system including a cylindrical lens, the optical system sharply imaging the target profile so as to produce an extending pattern of parallel equal exposure levels normal to the target profile, as represented by spaced parallel lines, in a plane including the emulsion surface of the photographic material;
   exposing the photographic material in accordance with the established exposure to a source of light modulated by the target pattern; and
   processing the photographic material so as to produce on the emulsion surface a relief image comprising the array of cylindrical lenticular elements having the same predetermined profile.

2. The method in accordance with claim 1 wherein the predetermined profile is substantially circular.

3. The method in accordance with claim 1 wherein the predetermined profile is substantially parabolic.

4. A method of producing an array of lenticules on the emulsion surface of a photographic material having operating and frequency response curves in accordance with the photographic characteristics of the emulsion, each of the elements having the same predetermined cross section, comprising the steps of:
   forming a first light modulating target having a first cyclical pattern of predetermined profile for the lenticule cross section in one direction, the pattern being mathematically related to the cross section and the operating and frequency response curves of the emulsion;
   forming a second light modulating target having a second cyclical pattern of predetermined profile for the lenticule cross section in an other direction perpendicular to the one direction, the pattern being related to the cross section in the other direction and the operating and frequency response curves of the emulsion;

establishing an exposure for a first and a second photographic material on which the first and second targets are to be exposed, respectively;

positioning successively the first and second targets in the object plane of an optical system including a cylindrical lens, the optical system sharply imaging the targets so as to produce with respect to each cyclical pattern an extending pattern of parallel, equal exposure levels normal to the profile patterns, as represented by spaced parallel lines, in a plane including the emulsion surface of the first and second photographic materials, respectively;

exposing successively the first and second photographic materials in accordance with the established exposure to a source of light modulated, respectively, by the first and second cyclical patterns;

processing the first and second photographic materials to produce respective first and second images comprising parallel regions of equal density corresponding, respectively, to the first and second cyclical patterns;

superimposing the first and second photographic materials in the object plane of a second optical system such that the parallel regions of equal density are oriented relative to one another at an angle greater than zero;

exposing the photographic material positioned in the image plane of the second optical system to the superimposed and oriented images on the first and second photographic materials; and processing the photographic material so as to produce on the emulsion surface thereof a relief image comprising the array of lenticules having the same predetermined cross section.

5. The method in accordance with claim 4 wherein the equal density regions of the first and second images are superimposed at right angles to one another for exposure onto the photographic material to produce a rectangular array of lenticules.

6. The method in accordance with claim 4 wherein the first and second target profiles are selected to produce substantially identical lenticules.

7. The method in accordance with claim 4 wherein the first and second target profiles are the same.

8. The method in accordance with claim 7 wherein the lenticules formed are spherical.

9. The method in accordance with claim 7 wherein the lenticules formed are parabolic.

10. The method in accordance with claim 4 wherein the profile patterns of the first and second target are different.

11. The method in accordance with claim 4 wherein the profile patterns of the first and second targets are each exposed at a different magnification onto its respective photographic material.

12. The method in accordance with claim 4 wherein the profile patterns of the first and second targets are different and form lenticules, each of which is circular in cross section in one plane and parabolic in cross section in a plane normal to the one plane on the emulsion surface of the photographic material.

13. The method in accordance with claim 4 wherein the first and second targets have the same profile and the processed first and second photographic materials, when superimposed relative to one another, produce spherical lenticules on the emulsion surface of the photographic material upon exposure thereto and processing thereof.

14. The invention in accordance with claim 4 wherein the first and second targets have the same profile and the processed first and second photographic materials, when superimposed relative to one another, produce parabolic lenticules on the emulsion surface of the photographic material upon exposure thereto and processing thereof.

15. The method in accordance with claim 4 wherein the first and second targets have different profiles and the processed first and second photographic materials, when superimposed relative to one another, produce elliptical lenticules on the emulsion surface of the photographic material upon exposure thereto and processing thereof.

16. The method in accordance with claim 15 wherein the elliptical lenticules are parabolic in two orthogonally related cross sections.

17. The method in accordance with claim 15 wherein the elliptical lenticules are circular in two orthogonally related cross sections.

18. The method in accordance with claim 15 wherein the elliptical lenticules are parabolic in cross section in one direction and circular in cross section in another direction perpendicular to the one direction.

19. The method in accordance with claim 4 wherein the first and second targets have the same profile and one target is first exposed at one magnification to the first photographic material and at a second and different magnification to the second photographic material to form lenticules having a first curvature in one cross section and a second curvature in an other cross section tht is perpendicular to the one cross section.

* * * * *